Apr. 17, 1923.
1,452,252
J. MÜLLER
AUTOMATIC SAFETY EXPANSION VALVE
Filed May 12, 1922
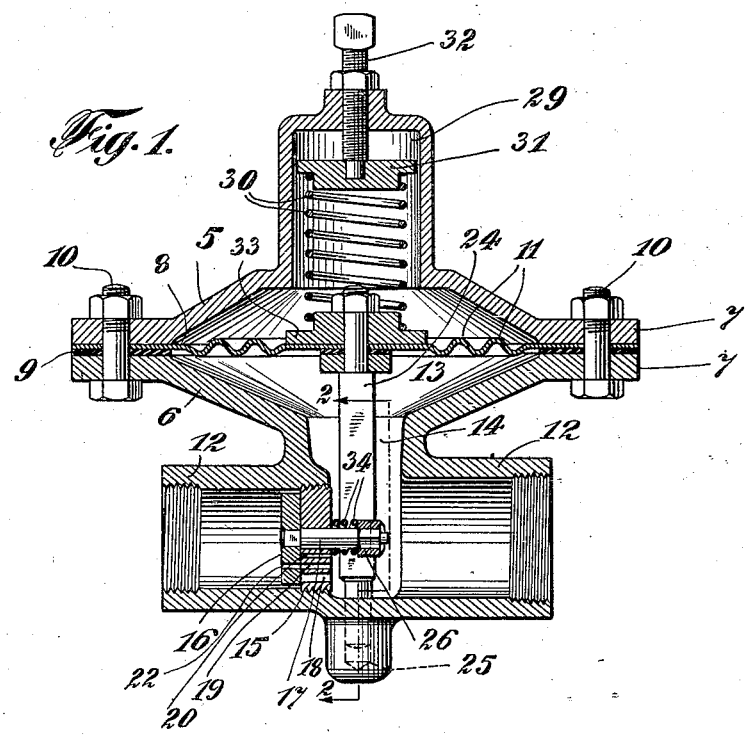
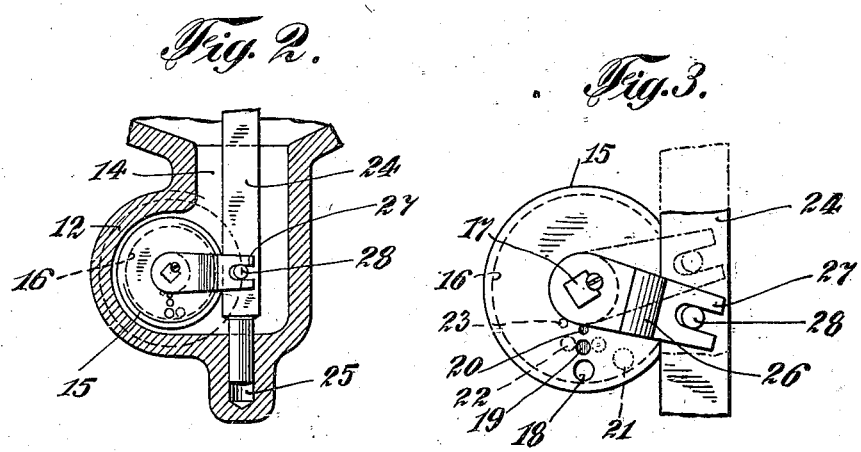
Inventor
Joseph Müller
By C. P. Goepel
his Attorney Patented Apr. 17, 1923.

1,452,252

UNITED STATES PATENT OFFICE.

JOSEPH MÜLLER, OF DAYTON, NEW JERSEY.

AUTOMATIC SAFETY EXPANSION VALVE.

Application filed May 12, 1922. Serial No. 560,409.

*To all whom it may concern:*

Be it known that I, JOSEPH MÜLLER, a citizen of the United States, residing at Dayton, in the county of Middlesex and State of New Jersey, have invented certain new and useful Improvements in Automatic Safety Expansion Valves, of which the following is a specification.

This invention relates to an automatic safety expansion valve for ice making machines.

It has heretofore been common in the art to provide an expansion valve interposed in the pipe line connection between the suction side of the ammonia pump and the ammonia cells of the apparatus. My present invention is primarily distinguished from such prior art devices in that the expansion valve is arranged at the discharge side of the ammonia pump, and is autocatically controlled and actuated by back pressure exceeding a predetermined limit which it is desired to maintain in the ammonia cells of the apparatus.

In a practical embodiment of my invention, I provide a valve casing adapted to be coupled to the discharge side of the pump and provided with a rotary valve, whereby the volume of flow of the ammonia under pressure is regulated. This valve is automatically actuated through the medium of a pressure influenced diaphragm to which an axially movable rod is connected and operatively associated with said rotary valve.

It is a further object of my present improvement to provide an automatic safety expansion valve of the above character, which consists of relatively few parts, of simple construction, so that the valve will be reliable and positive in its operation, not likely to get out of order and capable of being easily and quickly assembled or disassembled. Another object of the invention is to provide a valve of the class specified having its operating parts so constructed and related as to provide a quick movement of said parts, thereby making the valve sensitive and responsive to slight changes in the conditions under which it operates.

With the above and other objects in view, the invention consists in the improved safety expansion valve, and in the form, construction and relative arrangement of its several parts, as will be hereinafter more fully described, illustrated in the accompanying drawings and subsequenty incorporated in the subjoined claims.

In the drawing, wherein I have shown one satisfactory and practical embodiment of the invention, and in which similar reference characters designate corresponding parts throughout the several views, Fig. 1 is a diagrammatical sectional view through the improved expansion valve;

Fig. 2 is a detailed section, taken on the line 2—2 of Fig. 1; and

Fig. 3 is an enlarged detailed elevation illustrating different positions of the rotary valve member.

For purposes of illustration, I have selected a well known type of expansion valve body, consisting of the two mating sections 5 and 6 respectively, each of said sections being provided with a marginal flange 7 between which the edge portion of a flexible diaphragm 8, preferably of sheet metal, and a gasket 9 are arranged. The two valve body sections with the interposed diaphragm are detachably held in assembled relation by a series of clamping bolts 10, extending through the marginal flanges 7. Preferably the diaphragm 8 is formed with an intermediate series of annular corrugations 11.

The section 6 of the valve body is centrally formed with oppositely extending nipples 12, which are adapted to be connected by suitable coupling means in the discharge pipe line from the ammonia pump, said nipples communicating with the chamber 13 at one side of the diaphragm 8, through the passage-way 14.

In the inner end of the nipple 12, which is opposed to the discharge side of the pump, a detachable disc 15 is threaded. A rotary valve plate 16 is arranged at the outer side of this disc, the valve stem 17 upon one end of which said plate is fixed having a central bearing in the disc 15. This disc is provided with a series of spaced openings 18, 19 and 20 respectively, in radial alignment with each other, and successively decreasing in diameter in the order stated, with the larger opening 18 located adjacent to the periphery of said disc.

The rotary valve plate 16 is likewise provided with a series of openings 21, 22 and 23, of successively decreasing diameters. The openings of the valve plate are not, however, radially aligned, but are disposed in circumferentially staggered relation, the purpose of such arrangement being apparent from the following description.

A rod 24 is rigidly fixed at one of its ends to the diaphragm 8, said rod extending through the passage 14, and having its other end loosely engaged in a guide socket 25 formed on the connecting wall of the nipples 12. It will be observed from reference to Fig. 2 of the drawings, that the axis of the nipples 12 is laterally offset from the axis of the passage 14, and that the rod 24, therefore, is positioned at one side of the axis of the rotary valve. The valve stem 17 is operatively connected to said rod, through the medium of an arm 26 suitably fixed at one of its ends to the valve stem, and provided in its other end with a slot 27, to receive a pin or stud 28 fixed in the rod 24.

The section 5 of the valve body is formed with a bonnet 29, which provides a housing for the coil spring 30, one end of which bears against an adjustable head 31 swivelled upon the inner end of a screw 32, which is threaded in the end wall of the bonnet 29. The other end of said spring bears against a suitable seat 33 which is secured against one side of the diaphragm 8 by the fastening means for the rod 24.

In the practical operation of the improved expansion valve, the tension of the spring 30 is properly regulated by the adjustment of the screw 32, so that the diaphragm 8 and rod 24 will maintain a normal position under a predetermined limited back pressure through the discharge pipe line from the ammonia pump to the cells or other part of the apparatus. In this normal position the arm 26, fixed to the valve stem, is disposed in angular relation to the rod 24, as seen in Fig. 3 of the drawing, and the largest opening 21 in the rotary valve plate is in registering relation with the largest opening 18 in the disc 15, so that the ammonia is discharged under pressure by the pump in maximum volume. Assuming the discharge pressure to be 160 lbs. and the permissible limit of back pressure, while maintaining a maximum discharge pressure, to be 25 lbs., upon an excess in the back pressure, the diaphragm 8 is flexed against the resistance of the spring 30 and an axial movement is thus imparted to the rod 21, such movement of the rod being translated into a rotary movement of the valve plate 16 through the medium of the arm 26. The opening 21 in the valve plate will thus be gradually moved out of registration with the opening 19 in the disc 15, and at the same time the next smaller opening 22 in the valve plate moves into registered relation with the opening 19 in the disc. Thus the volumetric flow of the ammonia is automatically cut down as the back pressure increases, and when such back pressure has increased to say 28 lbs., the larger opening 18 in the disc 15 will be completely closed by the valve plate, while the discharge of the ammonia is continued in reduced volume through the registered opening 19 and 22. A further increase in back pressure operates in the manner above stated to continue the rotation of the valve plate, so that when a back pressure of say 30 lbs. has been reached the smallest opening 23 in the valve plate will be in registering relation with the opening 20 in the disc 15. This relative position of the parts I have illustrated in dotted lines in Fig. 3 of the drawings. Assuming further that the limit of safety would be reached with a back pressure of 35 lbs., it will be evident that any further increase in back pressure will continue the rotation of the valve plate so as to cut off the flow of ammonia through the smallest opening 20 in the disc 15, before this safety limit is reached, thus completely shutting off the supply of ammonia from the feed pump to the ammonia cells and thereby avoiding the possible destruction of the apparatus.

The series of holes or openings in the rotary valve plate and the fixed disc may be of any desired size in accordance with the capacity of the machine. It is also to be noted that in the event that the smaller hole in the valve becomes clogged up, the back pressure gradually decreases, and owing to the spring tension, the valve plate is rotated to open the next larger hole therein. Thus, it will be seen that after the valve has once been properly adjusted to the desired pressure to be maintained in the system, it is self-acting and requires no further attention.

In order to maintain a tight bearing contact between the rotary valve plate 16 and the face of the disc 15, I preferably arrange an expansion spring 34, upon the valve stem 17, between the disc 15 and the arm 26.

From the above description, it will be understood that in proportion to the decrease in back pressure, the rod 24 and the valve plate 16 are moved towards their normal positions, until the openings 18 and 21 are again in registering relation and the full maximum discharge flow of the ammonia is again re-established. I have herein referred to one arrangement of the openings or ports in the fixed disc and the rotary valve plate, but of course such arrangement is purely suggestive, since it is manifestly possible to otherwise arrange these openings and to either decrease or increase the number thereof, while still accomplishing substantially the desired result. Likewise, I have referred to a particular operating connection between the rotary valve and the axially movable rod 24. It is within the contemplation of my present invention to substitute for such an operating connection various other equivalent devices, which might possibly in many instances be found preferable and desirable. It will, however, be appreciated that the embodiment of the device herein shown, is an exceedingly simple one, so that the various parts will function in a reliable and positive manner. Nevertheless, since it is apparent that the improved safety expansion valve is susceptible of embodiment in numerous other alternative constructions, it is to be understood that I reserve the privilege of resorting to all changes in the construction and arrangement of the various elements as may be fairly considered within the spirit and scope of the invention.

What I claim is:

1. An automatic expansion safety valve, comprising a casing provided with an inlet and an outlet opening, a pressure influenced diaphragm within the casing, a valve seat between the inlet opening and the interior of said casing having a series of spaced openings in radial alignment, and successively decreasing in diameter from the outer margin of said seat inwardly, a valve plate on one side of said seat having a series of spaced openings, arranged in circles of different radii, and in staggered relation to each other, the openings of said valve plate being adapted to register with openings of similar diameter in said seat on rotation of said valve plate, and means connected with said diaphragm and valve plate adapted to impart a rotary movement to said valve plate.

2. An automatic expansion safety valve, comprising a casing provided with an inlet and an outlet nipple having their axial lines offset from the axial line of said casing, a pressure influenced diaphragm within the casing, a valve seat in axial alignment with the inlet nipple, having a series of spaced openings in radial alignment and successively decreasing in diameter from the outer margin of said seat inwardly, a valve plate on one side of said seat having a series of openings corresponding in diameter with the openings of said seat, arranged in circles of different radii and in staggered relation to each other, the openings of said valve plate being adapted to register with corresponding openings of said seat on rotation of said valve, and means connected with said diaphragm and valve adapted to impart rotary movement to said valve plate.

3. An automatic expansion safety valve, comprising an outer casing having an inlet and an outlet nipple offset at their axial line from the axial line of said casing, a valve seat detachably mounted within the inlet nipple and having a series of spaced openings in radial alignment, and successively decreasing in diameter from the outer margin of said seat inwardly, a valve plate on one side of said seat having a series of openings of successively decreasing diameter corresponding in size with the openings of said seat, arranged in circles of different radii and in staggered relation to each other, the corresponding openings of said valve plate and seat being adapted to register with each other on rotation of said valve, an operating rod fixed to said diaphragm, a valve stem secured to said valve plate, and an arm secured to said valve plate and having a loose jointed connection with said rod.

4. An automatic expansion safety valve, comprising an outer casing provided with an inlet and an outlet nipple offset at their axial line from the axial line of said casing, a pressure influenced diaphragm within the casing, a valve seat within the inlet nipple having a series of spaced openings in raidial alignment, and successively decreasing in diameter from the outer margin of said seat inwardly, a valve plate on one side of said seat having a series of openings corresponding in diameter with those of said valve seat arranged in circles of different radii, in staggered relation to each other, and adapted to register with corresponding openings of said seat on rotation of said valve, the openings of said valve plate being all arranged within a small area relative to that of said valve plate, and means operatively connecting said diaphragm and valve plate.

In testimony that he claims the foregoing as his invention, he has signed his name hereunder.

JOSEPH MÜLLER.